United States Patent
Bewick

(10) Patent No.: US 6,408,076 B1
(45) Date of Patent: Jun. 18, 2002

(54) DIGITAL VIDEO BROADCASTING

(75) Inventor: Simon Bewick, Reading (GB)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/034,656

(22) Filed: Mar. 3, 1998

(30) Foreign Application Priority Data

Mar. 6, 1997 (GB) ............................................. 9704630

(51) Int. Cl.[7] .............................................. H04N 7/167
(52) U.S. Cl. ...................... 380/206; 380/203; 380/205; 380/210; 380/239; 341/55; 341/88
(58) Field of Search ................................. 380/203, 205, 380/206, 200, 210, 216, 218, 239, 240, 221; 341/55, 88

(56) References Cited

U.S. PATENT DOCUMENTS

| 4,458,268 A | * | 7/1984 | Ciciora ....................... 358/120 |
| 4,613,901 A | * | 9/1986 | Gilhousen et al. ........... 358/122 |
| 4,646,147 A | * | 2/1987 | Kruger ......................... 380/14 |
| 4,710,921 A | * | 12/1987 | Ishidoh et al. ........... 370/110.1 |
| 5,091,936 A | * | 2/1992 | Katznelson et al. .......... 380/19 |
| 5,606,612 A | * | 2/1997 | Griffin et al. ................. 380/14 |
| 5,682,425 A | * | 10/1997 | Enari .......................... 380/10 |
| 5,818,934 A | * | 10/1998 | Cuccia .......................... 380/9 |
| 5,870,474 A | * | 2/1999 | Wasilewski et al. .......... 380/21 |

* cited by examiner

Primary Examiner—Tod R. Swann
Assistant Examiner—Paul E. Callahan

(57) ABSTRACT

In order to descramble sections of scrambled data interleaved with sections of unscrambled data in a transport stream of broadcast video data, while leaving the sections with the original timing relationship in the transport stream, a common data flow path (1–5) is provided both for sections of scrambled data and sections of unscrambled data and signal path loops (6,7; 8,9) including cipher means (62,64) to enable the descrambling of scrambled data, and a control state machine for controlling the flow of data through said common data flow path and said signal path loops to enable passage of unscrambled data sections and descrambling of scrambled data sections, while maintaining the desired relative positions of the data sections.

15 Claims, 10 Drawing Sheets

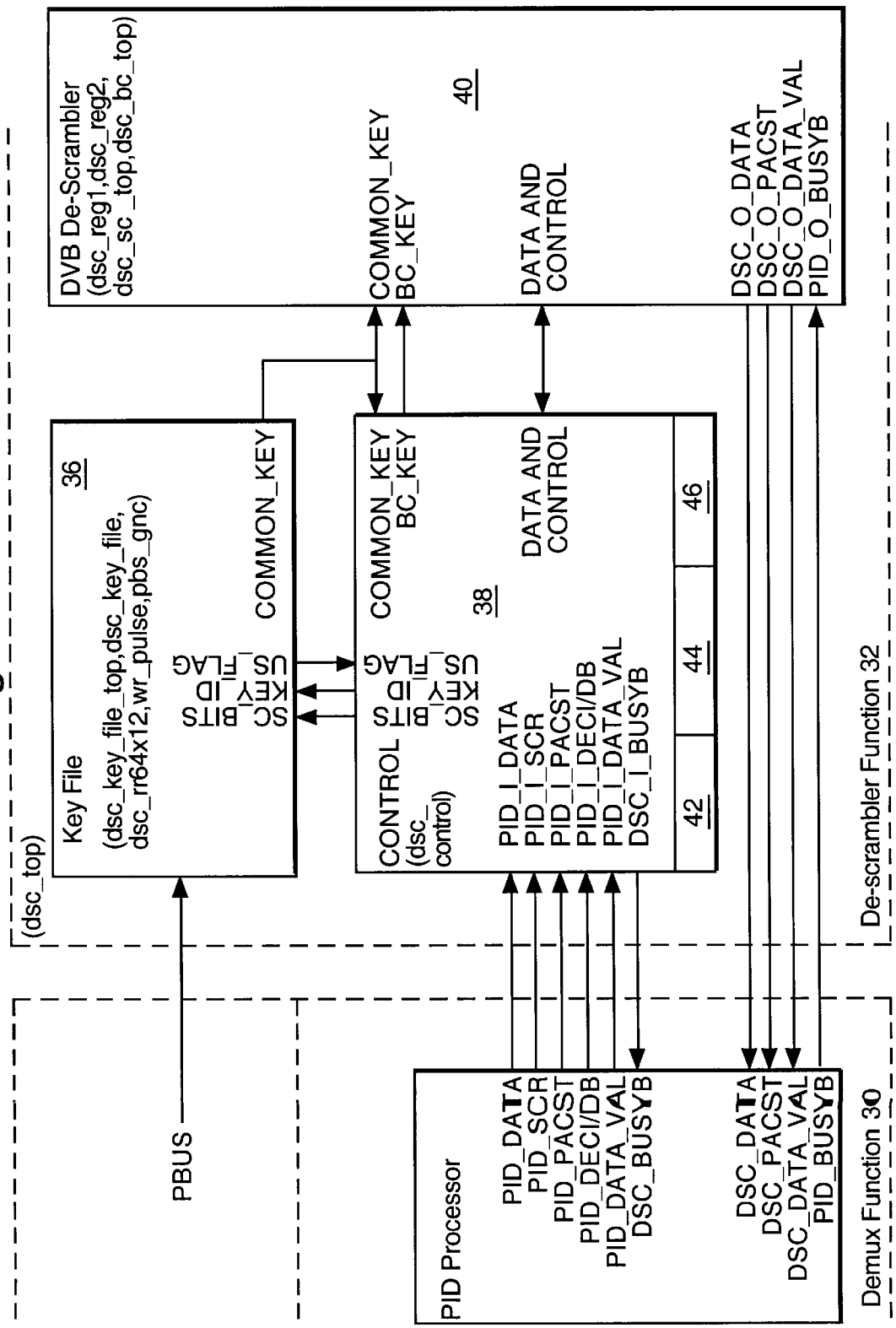

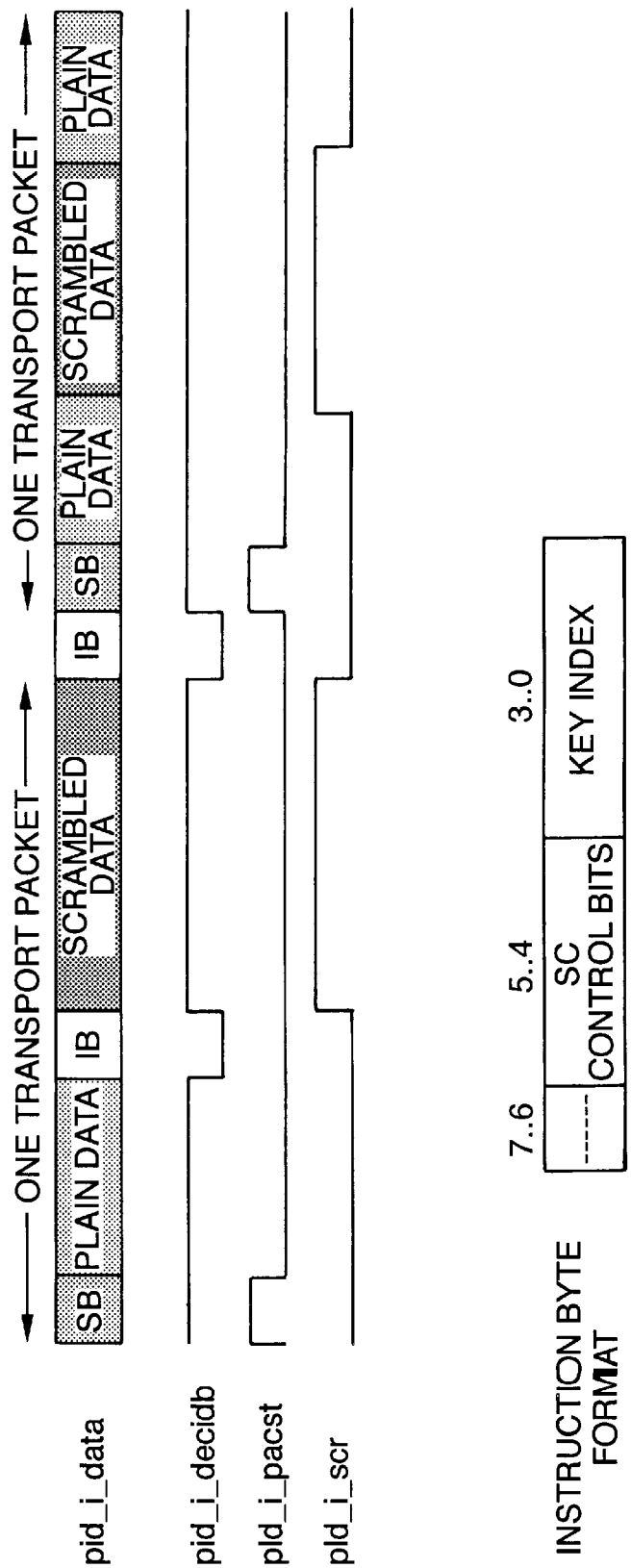

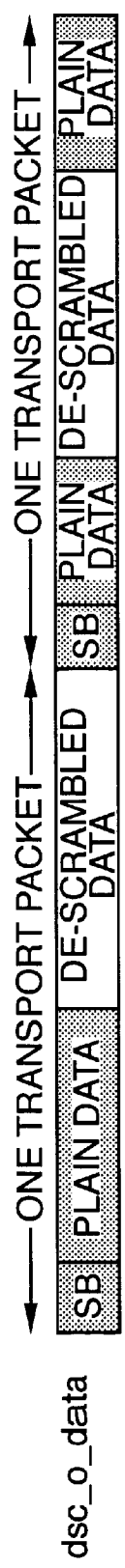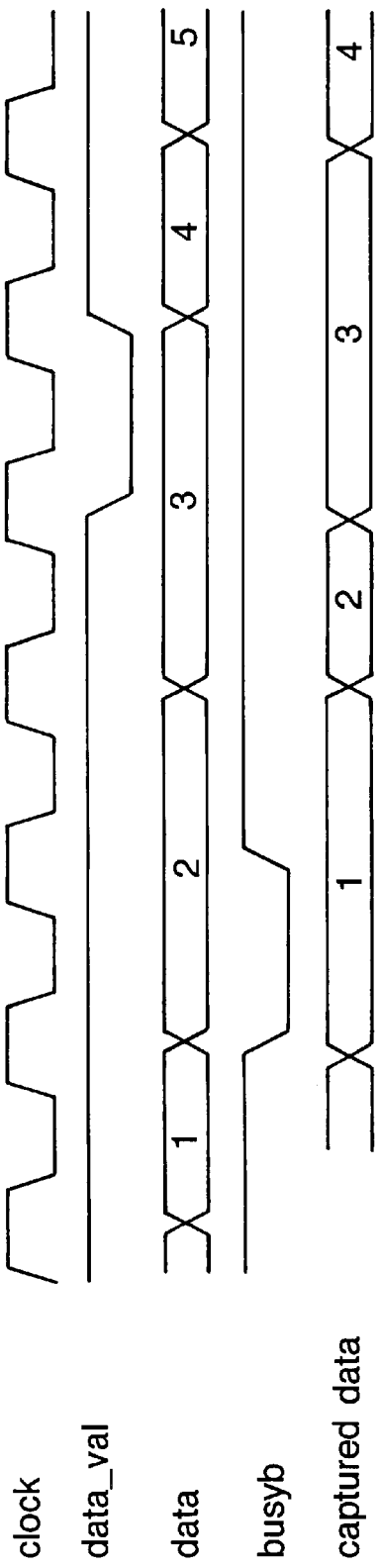
Fig.5.

DIGITAL VIDEO BROADCASTING

FIELD OF THE INVENTION

The present invention relates to the field of digital video, and in particular to digital video broadcasting.

BACKGROUND ART

Scrambling techniques are commonly used in video applications such as payment-on-demand cable TV. A common technique for scrambling analogue video signals is to randomise the position of the horizontal synchronisation pulse. Frequently, an incoming video signal will contain sections of scrambled video interleaved with sections of unscrambled video and it is necessary to distinguish between them in the processing circuits—see for example U.S. Pat. No. 4,926,477.

As regards digital broadcasting (DVB) various standards have been set, and in particular a standard has been set, known as the Common scrambling specifications devised by the European project for digital video broadcasting, concerning the scrambling and descrambling of data (the DVB algorithm). Essential characteristics of the DVB algorithm are shown in FIG. 1. A packet 2 of data having a header field HEADER followed by n consecutive blocks (of 8 bytes) of scrambled data SB(n) is applied to a stream cipher 4, of a form defined by the common scrambling specifications. The scrambled data is deciphered on a block by block basis with the first block SB(1) being used for initialisation, and each subsequent block being subject to the stream cipher CB and then passed as an intermediate block IB(n) to a block cipher unit 6, also of a form defined by the common scrambling specification. Each block is subject to a block deciphering operation BD and descrambled blocks DB(n) are output for assembly into a descrambled packet 8.

A more specific implementation of the descrambler of FIG. 1 is shown in FIG. 2, wherein scrambled data is applied to a stream cipher unit 10 and a first input of an exclusive OR gate 12. The output of cipher unit 10 is applied to a second input of gate 12. The output of gate 12 is applied to an 8 byte register 14 (herein referred to as Reg1), which provides an 8 byte delay. A parallel output of Reg1 is coupled to a block cipher unit 16. A serial output of Reg1 is coupled via a two way switch 18 to an 8 byte register 20 (providing a further 8 byte delay—referred to herein as Reg2) and to a first input of an exclusive OR gate 22. The output of block cipher unit 16 is connected as a parallel input to Reg2 and a serial output of Reg2 is applied to a second input of exclusive OR gate 22. The output of gate 22 provides descrambled data. It will be understood that the presence of the two registers Reg1, Reg2 in the data path stream creates substantial 16 byte delay. The notation in FIG. 2 is as follows:

k indexes scrambled bytes through the stream
p end of a scrambled field
n number of complete 8 bytes blocks in a scrambled field
r the residue that is left in a scrambled field after the last complete 8 byte block of that scrambled field For compressed video signals, compressed according to the MPEG standards, the application of the DVB descrambler algorithm to MPEG transport data streams requires that the fields of scrambled data contained in the received transport stream be extracted from the stream, descrambled according to the DVB descrambler algorithm, then reinserted into their original place in the received transport stream.

Where the transport stream contains interleaved sections of scrambled video and unscrambled video (plain text) a problem therefore arises in that the descrambling of the scrambled sections naturally introduces a time delay and it is not therefore possible to reinsert the descrambled sections to their original place in the transport steam without further modification of the receiving system.

SUMMARY OF THE INVENTION

It is an object of the invention to provide a simple and inexpensive means of descrambling scrambled data in a transport stream containing sections of both scrambled and unscrambled data.

In accordance with the present invention, there is provided apparatus for processing a stream of digital video broadcast data containing interleaved sections of scrambled data and unscrambled data, the apparatus including a common data flow path provided both for sections of scrambled data and sections of unscrambled data, one or more data flow path loops extending from and back to said common data flow path and containing cipher means to enable the descrambling of scrambled data, and a control means capable of assuming a plurality of control states for selectively controlling the passage of data through the data flow paths to enable passage of unscrambled data sections in said common data flow path and descrambling of scrambled data sections in said data flow loops, while maintaining the relative positions of the data sections in this data stream.

In accordance with the invention, since a single main data flow path is provided, with control of the main data flowpath and the data flow path loops, the passage of unscrambled sections and scrambled sections of data can be regulated to avoid problems of reinsertion of descrambled data and resynchronisation to a single data stream.

The present invention provides in a specific aspect apparatus for processing digital video broadcast data comprising interleaved sections of scrambled and unscrambled data, the apparatus comprising:

a data input terminal coupled to a first input of an exclusive OR gate means, a stream cipher means having an input connected to said data input terminal and an output connected to a second input of the exclusive OR gate means;

a first shift register means having an input coupled to receive the output of the exclusive OR gate means, and having first and second outputs, a second shift register means having a first input coupled to the first output of the first shift register means, and having a second input and an output, a block cipher means coupled between the second output of the first shift register means and the second input of the second shift register means; and a control means responsive to whether data at said data input terminal is scrambled data or unscrambled data for selectively enabling said stream cipher means, block cipher means and first and second shift register means (a) to pass an unscrambled data directly through said first and second shift register means and (b) to pass scrambled data through said stream and block cipher means.

In accordance with the invention, since a single data flow path is provided a more secure, reliable and inexpensive system is provided. Whilst other arrangements may be envisaged for example splitting the data into completely separate data flow paths for scrambled and unscrambled data with appropriate delays in the flow paths to maintain correct timing relationships, this would result in a more expensive system.

The single data stream path in accordance with the invention is preferably arranged that it cannot pass both a scrambled byte of data and a non-scrambled data and that further the two shift register means do not contain gaps between successive fields of data. These two conditions mean that scrambled and non-scrambled fields follow each other without either a gap or an overlap, in data (but not necessarily in time intervals), and since the non-scrambled data uses the same shift register means, providing a 16 byte time delay as is used by the scrambled data, the problem of inserting non-scrambled data into the descrambled data stream does not arise and is automatically solved.

The control means preferably comprises a control state machine, preferably occupying a number of predefined states in which it issues appropriate control signals to control the data stream. As preferred a key state machine is provided for controlling the issuing of keys to the cipher means for the descrambling process. A packet counter is preferably provided to count the number of bytes of the current signal packet of the incoming data stream up to a maximum of 184 bytes as permitted by MPEG-2. A first block counter is provided to count the number of bytes of a new scrambled field modulo 8; this counter controls said first shift register means. As preferred a second block counter is provided to count the bytes of a second block of data of a new scrambled field modulo 8. Two block counters are needed since there may be less than 8 bytes of unscrambled data between two successive scrambled fields.

BRIEF DESCRIPTION OF THE DRAWINGS

A preferred embodiment of the invention will now be described with reference to the accompanying drawings wherein:

FIG. 3 is a block diagram of a preferred embodiment of descrambling apparatus according to the present invention;

FIGS. 4 and 5 are wave form diagrams for apparatus of FIG. 3;

DESCRIPTION OF THE PREFERRED EMBODIMENT

Figure 1:
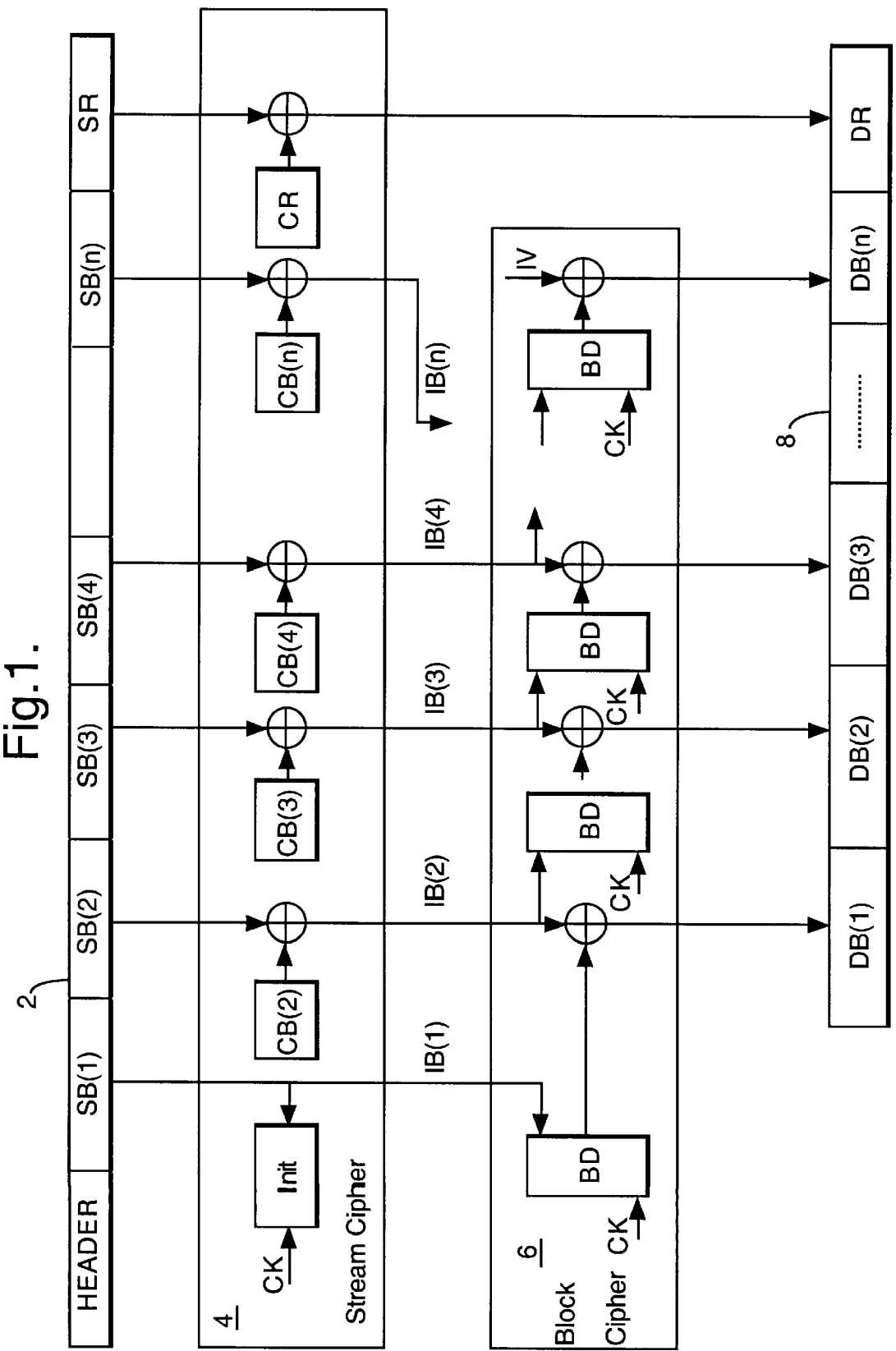
FIG. 1 is a diagram illustrating the concept of descrambling, according to the ETSI Common scrambling specifications.
Figure 2:
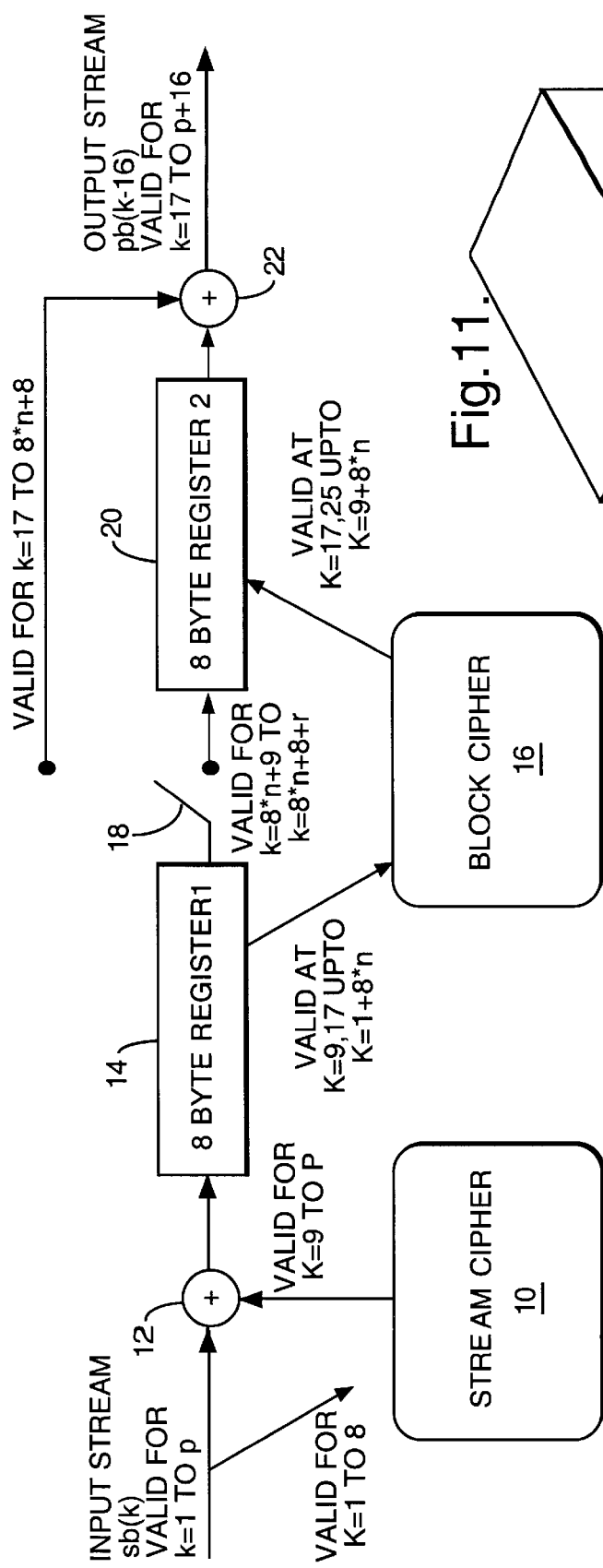
FIG. 2 is a more detailed implementation of a descrambling mechanism according to the ETSI Common scrambling specifications.

Referring to FIG. 3, the descrambling apparatus according to the present invention includes a demultiplexing function 30 and a descrambler function 32, both indicated in dotted lines. Function 30 includes a packet identification processor 34. Function 32 includes a key control and key generator unit 36, a control state machine 38, and a descrambler unit 40. Machine 38 includes counters 42, 44, 46 as will be described below.

Referring to FIGS. 4 and 5 the format of transport packets are shown as preceded by a synchronisation byte SB and include 188 bytes of data which may be scrambled data, plain data or a mixture of the two. Where scrambled data is provided, preceding instruction bytes IB may also be provided. The format of an instruction byte IB is shown in FIG. 4 as comprising bits 0 to 3 as a key index and bits 4 and 5 as SC control bits. Packet identification unit 34 provides the incoming packets, on pid_i_data to machine 38, and produces the wave forms shown in FIG. 4, pid_i_decidb, pid_i_pacst and pid_i_sr, which provide waveform steps in response to instruction bytes, synchronisation bytes and scrambled data sections respectively to machine 38.

As indicated in FIG. 5, descrambler unit 40 provides descrambled data assembled in packets dsc_o_data, together with a signal, dc_o_pacst in response to synchronisation bytes at the start of packets. Timing and validation signals clock, data_val, data, busyb and captured data are provided as indicated.

Figure 7:
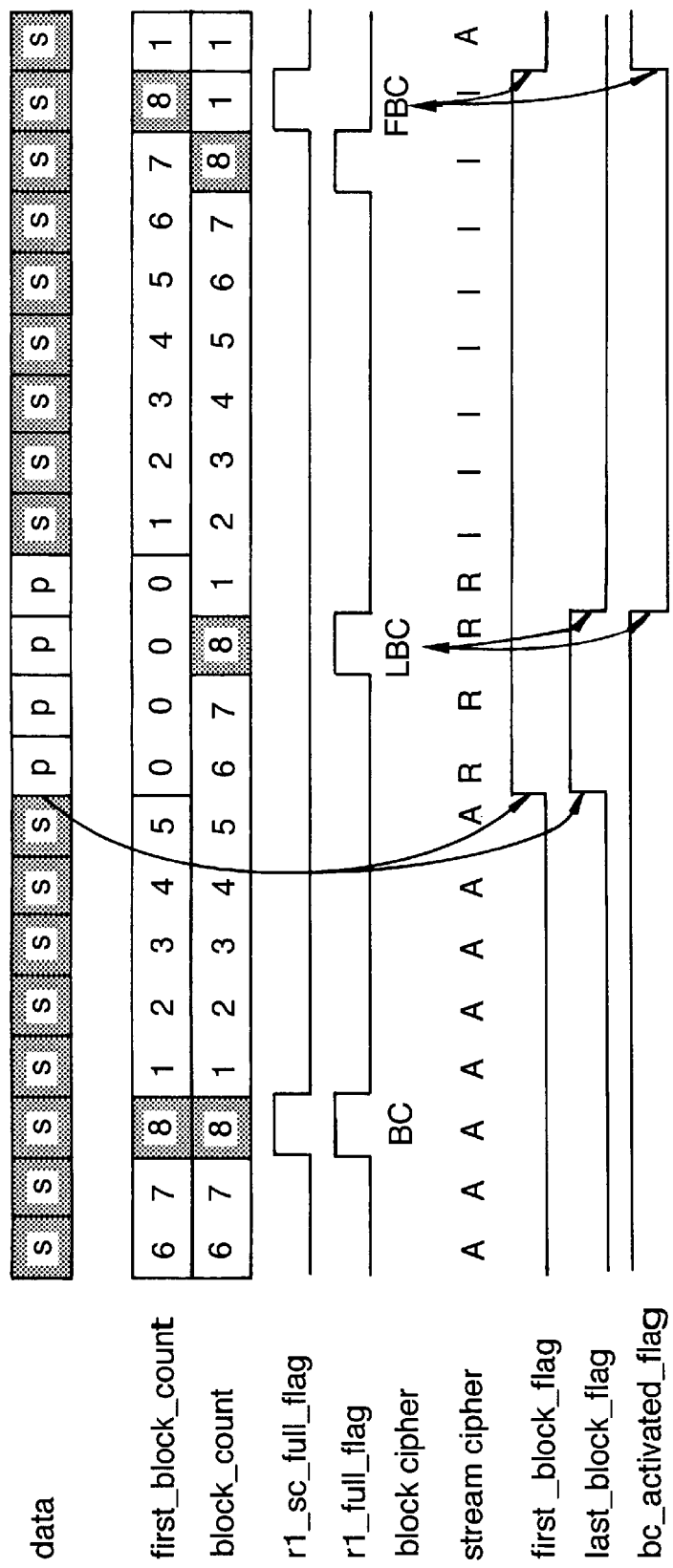
FIGS. 7 and 8 are timing diagrams showing operation of counters and flags in the apparatus of FIG. 3.
Figure 8:
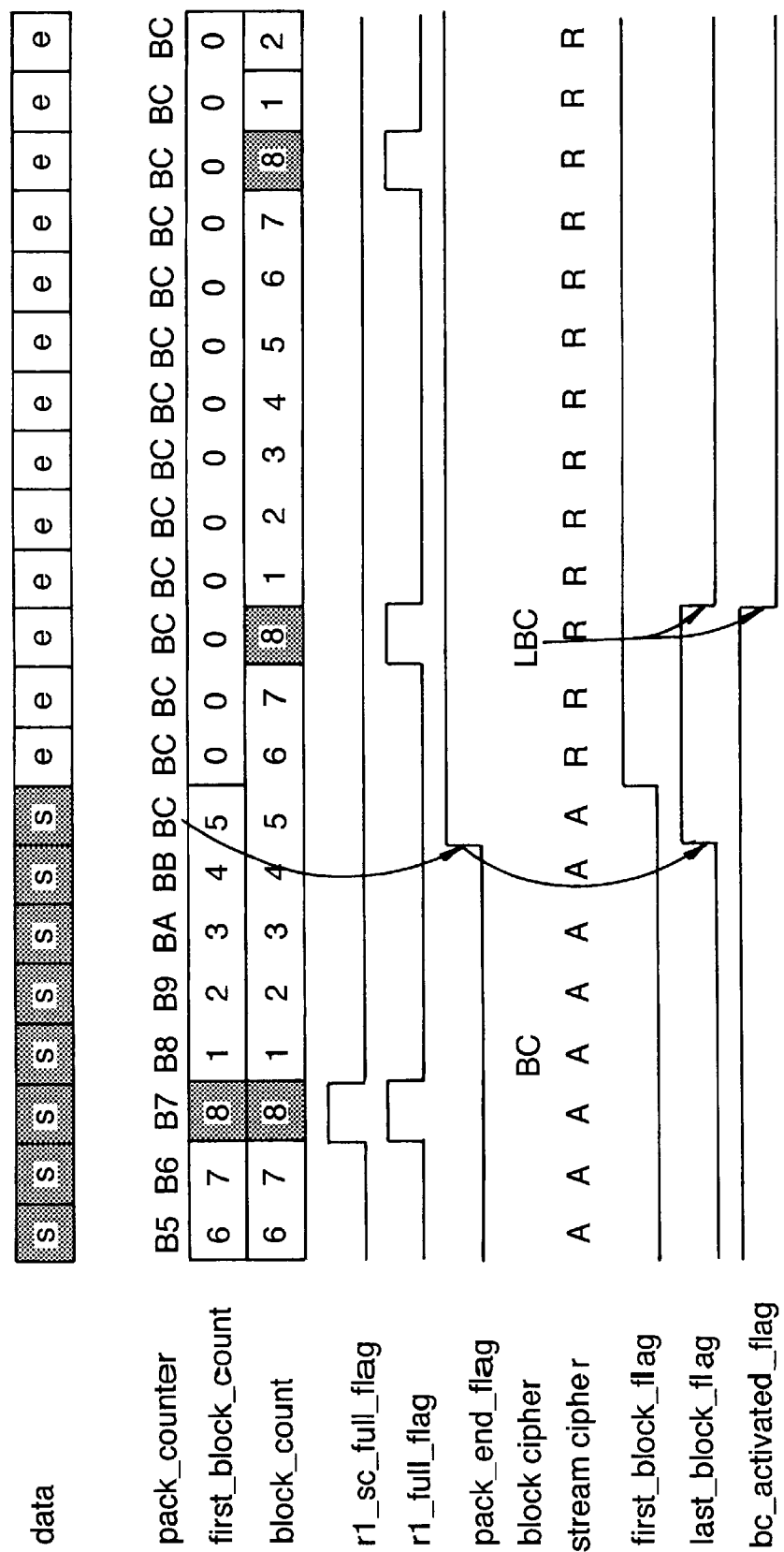

The control state machine 38 includes a counter 42, pack_counter for counting the bytes in a packet, a counter 44 for counting blocks of 8 bytes, first_block_count and a second counter 46 for counting bytes of blocks, block_count. The two block counters count the number of bytes of a new scrambled field modulo 8 to generate blocks. When the counters reach 8 they wrap round to 1. A zero value means the byte currently is unscrambled. Two block counters are needed since there may be less than 8 bytes of unscrambled data between two successive scrambled fields. The counters produce various flags as indicated in FIGS. 7 and 8 for controlling operation of the descrambler as referred to below.

Figure 6:
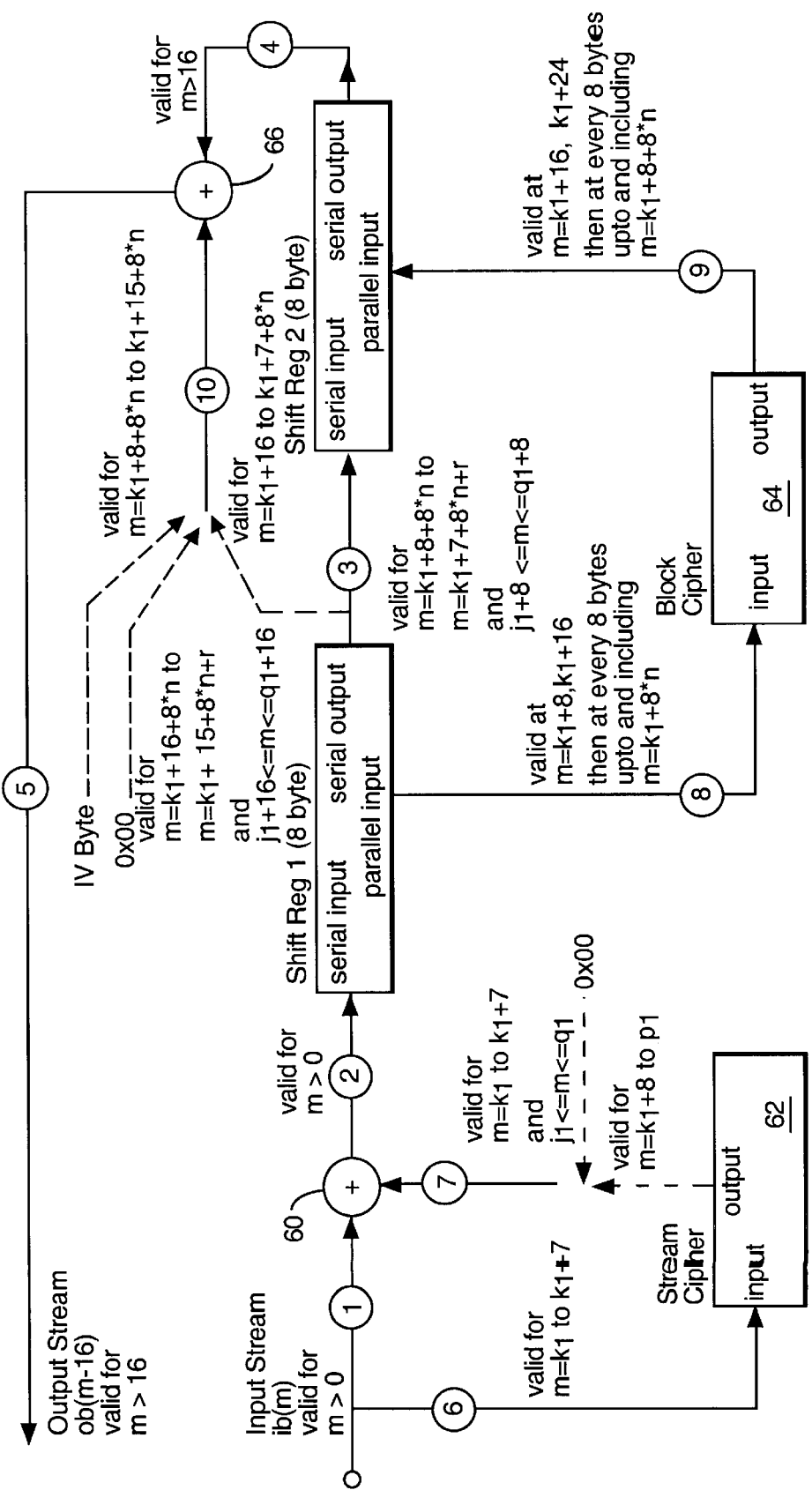
FIG. 6 is a more detailed block diagram of the preferred embodiment of descrambling apparatus according to the present invention.

Referring now to FIG. 6, this shows a more detailed diagram of unit 40 of FIG. 3, an input stream ib(m) (in FIG. 6, m indexes the incoming bytes, k indexes scrambled bytes and j to q refer to unscrambled bytes) is input on a data flow path (1) to an exclusive OR gate 60. The input stream is also applied on a data path (6) to a stream cipher unit 62, whose output is coupled by a data flow path (7) to a second input of exclusive OR gate 60. The output of exclusive OR gate 60 is coupled on data flow path (2) to a serial input of first shift register Reg1. Reg1 is an 8 byte shift register and provides a parallel output on a data flow path (8) and a serial output on a data flow path (3). Data flow path (3) is coupled to the serial input of 8 byte shift register Reg2 Data flow path (8) is coupled to a block cipher unit 64, and the output of block cipher unit 64 is coupled on a data flow path (9) to the parallel input of Reg2. The serial output of Reg2 is coupled via a data flow path (4) to an input of an exclusive OR gate 66, the output of which provides a descrambled output on data flow path (5). A further data flow path (10) is connected from the output of Reg1 to the second input of gate 66, in order to complete the DVB descrambling algorithm.

In use, scrambled data, m=k, is directed through the two signal path loops (6,7), (8,9) including ciphers 62, 64, and along signal path 10 to provide descrambled data. The two shift registers Reg1 and Reg2, supplying data to and receiving data from block cipher 64 eight bytes at a time, introduce a 16 byte delay. Sections of non-scrambled data, j<=m<=q are directed along the common data flow path 1, 2, 3, 4, 5. Since the common signal flow path includes the two byte serial shift registers Reg1 and Reg2, there is automatically provided the 16 byte time delay compensation to maintain timing with scrambled data sections, without the need for external delay elements.

The data flow paths 1, 2, 3, 4 and 5 are specified as indicated by the values of m in FIG. 6 to achieve two aims. Firstly that they never simultaneously pass both a scrambled byte and a non-scrambled byte, and secondly that they never result in Reg1 or Reg2 containing gaps between successive fields of data. These two conditions mean the scrambled and non-scrambled fields follow each other without either a gap or an overlap, and since the non-scrambled data uses the same circuitry to provide the 16 byte time delay as is used by the scrambled data, the problem of inserting the non-scrambled data back into the descrambled data stream does not arise and is therefore automatically solved.

Figure 9:
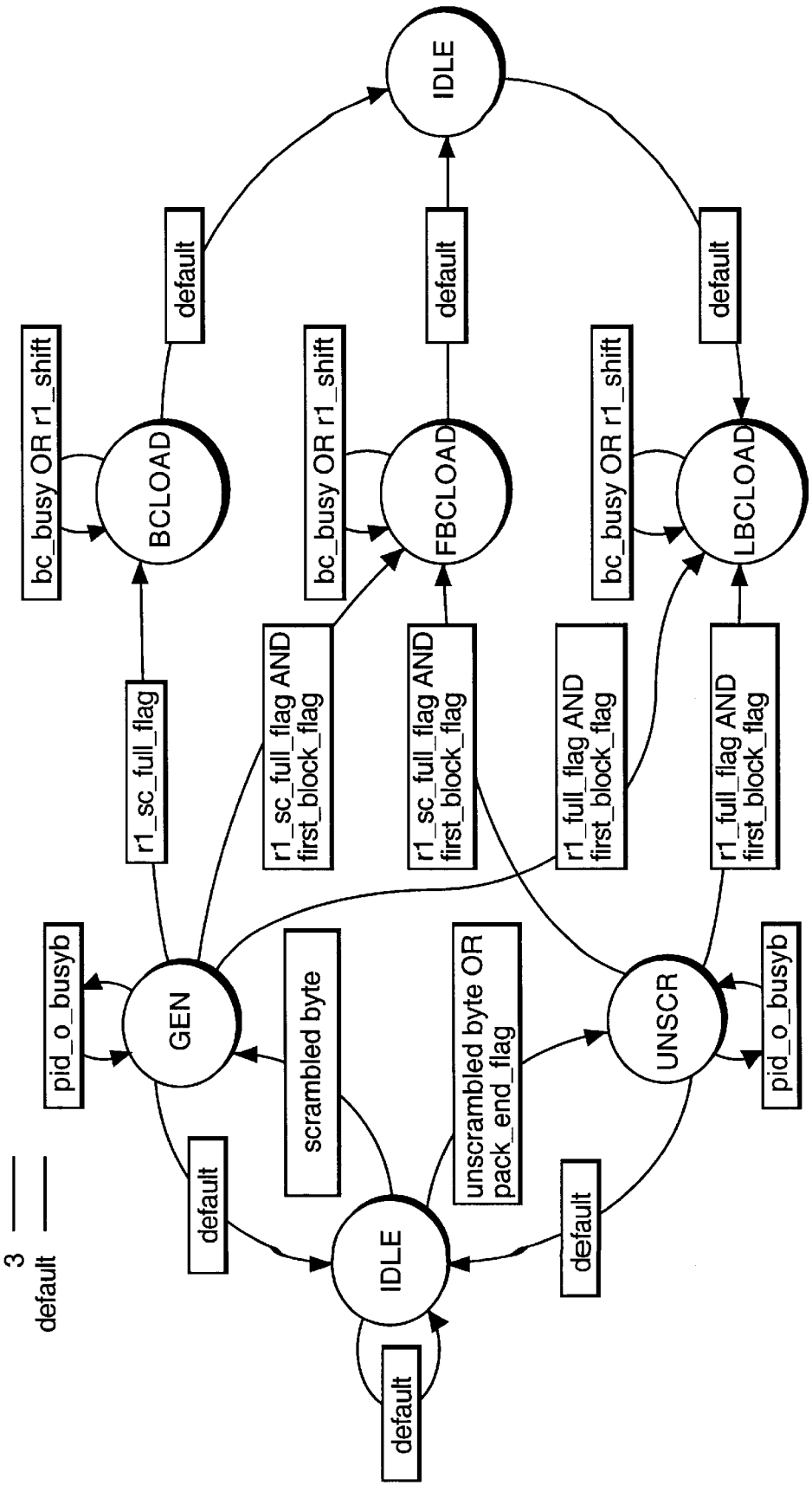
FIGS. 9 and 10 are diagrams indicating the operation of the control state machine in terms of transitions between states (9) and actions taken in the various states (10)
Figure 10:
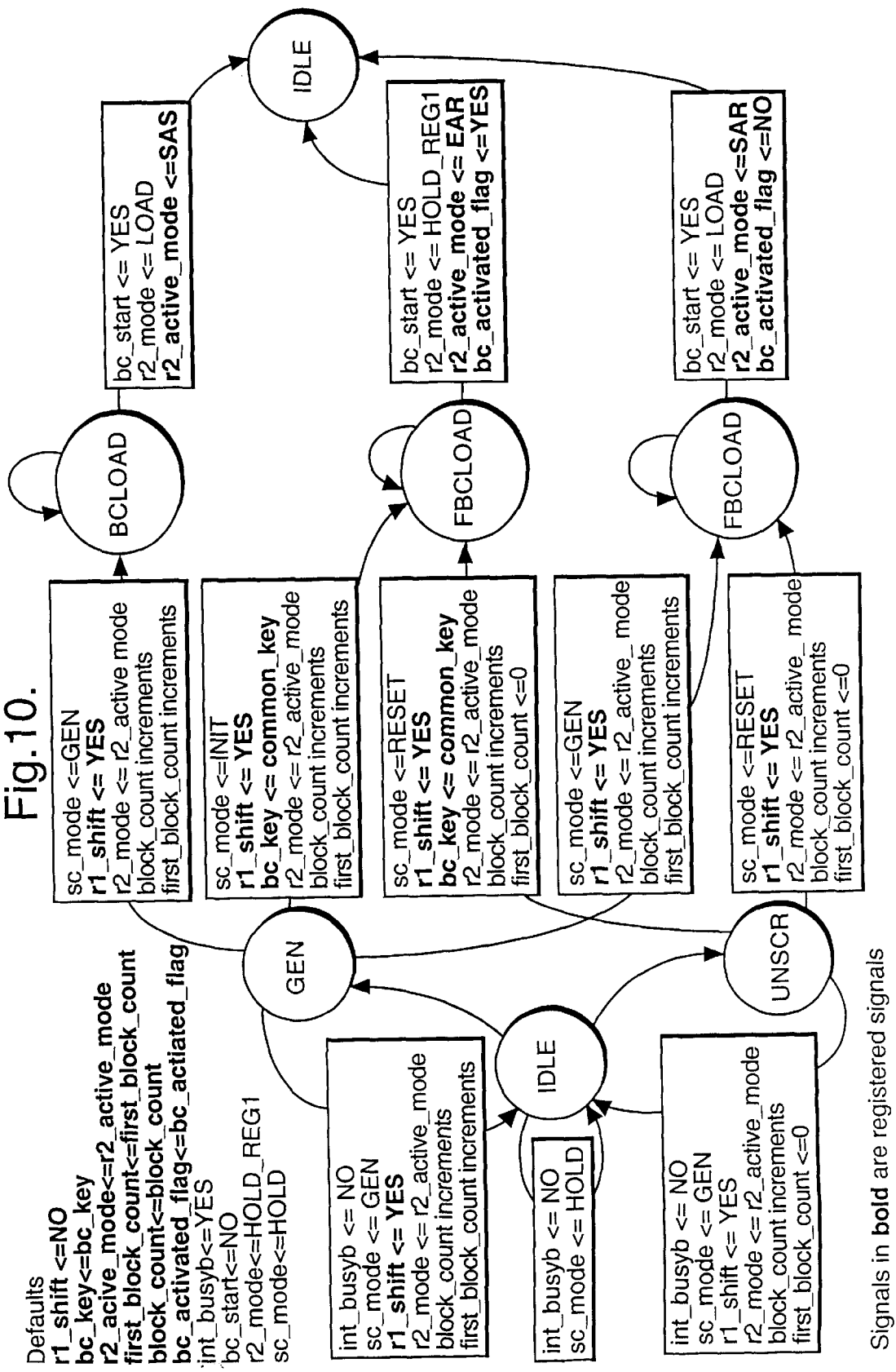

Referring now back to FIG. 3 together with the wave form diagrams of FIGS. 4 to 8 and the control operation diagrams of FIGS. 9 and 10, the function of the unit shown in FIGS. 3 and 6 are as follows:

packet counter 42: this counts the number of bytes since the last packet start. This counter is used to determine when the end of a packet is reached (188 bytes).

first block counter 44: this counts the bytes from the beginning of a new scrambled field modulo 8. This means that when the count reaches 8 it wraps around to 1. From this it is possible to determine when Reg1 is full with a complete scrambled block from a new scrambled field. The counter is defined from 0 to 8 with the 0 having the meaning that the byte currently in the first stage of Reg1 is unscrambled. Therefore unscrambled fields are not counted by this counter.

second block counter 46: this counts the bytes from the beginning of the second block of a new scrambled field modulo 8. From this it is possible to determine when Reg1 is full with the next block of scrambled data from the stream cipher.

Two block counters are needed since there may be less than 8 bytes of unscrambled data between two successive scrambled fields. In such a case Reg1 will not fill with the unscrambled data before the next scrambled field, i.e. Reg1 will contain both the end of the last scrambled field and the beginning of the next scrambled field. The control state machine needs to know when the last block is ready for emptying from the block cipher and when the first block has reached the end of Reg1, so two counters are needed.

From these counters a series of flags are produced as follows as shown in FIGS. 7 and 8:

first_block_flag: Indicates the block in Reg1 is the first block of a scrambled field last_block_flag: Indicates the block in the block cipher is the last block of a scrambled field.

r1_full_flag: Indicates that Reg1 is full with 8 new bytes (one block) of data.

It is set when block count is 7.

r1_sc_full_flag: Indicates that Reg1 is full with 8 new scrambled bytes of data. It is set when first block counter is 7.

pack_end_flag: Indicates that 188 bytes have been loaded since the last packet start.

Control State Machine 38: The state machine is held in signal 'current state' with the value of the state after the next clock being held in Register 'next state'. This state machine has 6 states—IDLE, GEN, UNSCR, BCLOAD, FBCLOAD, LBCLOAD as indicated in FIGS. 9 and 10. Referring to FIGS. 9 and 10, these states are as follows:

IDLE

Default state after reset. The internal controls in the descrambler are such that a new byte can be accepted. If a new byte is available and it is scrambled then the next state is GEN. If a new byte is available and it is un-scrambled then the next state is UNSCR. Otherwise the next State is IDLE.

GEN

The processing state for scrambled data. The stream cipher requires two clock cycles to process each byte. By default this will occur by advancing IDLE to GEN then back to IDLE. This is the normal flow for a scrambled data byte except in the following cases: if Reg1 is full and the block cipher contains the last block of a scrambled field then the next state is LBCLOAD; if Reg1 is full a block from a scrambled field and it is neither the first nor last block of that field then the next state is BCLOAD, if none of these cases are true then the next state is IDLE.

UNSCR

The processing state for unscrambled data. In reality unscrambled data only needs one cycle to process but providing a special state has two advantages. Firstly the cycle behaviour is the same for scrambled and unscrambled bytes. This inevitably reduces the special case requirements in the code thus increasing its reliability. Secondly the latency of the descrambler is the same for scrambled and unscrambled data which can simplify external interfacing requirements in some systems. In this state if Reg1 is full and the last block of a scrambled field is in the block cipher then the next state is LBCLOAD, and if Reg1 is full with the first block of a scrambled field then the next state is FBCLOAD; Otherwise the next state is IDLE.

BCLOAD

The processing state for loading and unloading the block cipher. This state is entered from GEN when Reg1 contains a new scrambled block that is neither the first block nor the scrambled residue of a scrambled field. This state waits until two conditions are true: firstly we have completed the shifting in of data; secondly the block cipher is currently idle i.e. it has finished its decipherment of the previous block. When these are true: Reg2 is loaded with the contents of the block cipher; the block cipher is loaded with the contents of Reg1 and the block cipher is started; Reg2 is set to mode 'Shift As Scrambled' (SAS); the next state is IDLE.

FBCLOAD

The processing state for loading the block cipher with the first block of a scrambled field. This state is entered from GEN when Reg1 contains a new scrambled block that is also the first block of a new scrambled field. In this case the block cipher does not contain a block from the current field, Any last block from the previous field will have been emptied into Reg2 by a LBCLOAD state. To correctly operate this scheme it is necessary to have at least one byte of unscrambled data between successive scrambled fields. This state waits for the same two conditions to be true as BCLOAD then performs the following: the block cipher is loaded with the contents of Reg1 and the block cipher is started; Reg2 is set to mode 'Empty As Residue' (EAR); the block cipher key Register 'bc key' is loaded with the latest 'common key'; the next state is IDLE.

LBCLOAD

The processing state for handling any possible scrambled residue for a scrambled field. This state is entered from the IDLE state when Reg1 is detected as having 8 new bytes that have not yet been processed and not all of those bytes are from the current scrambled field. Scrambled residue does not pass through the block cipher, but is instead serially passed into Reg2. There will be the previous block of data in the block cipher. This state waits until two conditions are true: firstly we have completed the shifting in of data; secondly the block cipher is currently idle i.e. it has finished its decipherment of the previous block. When these are true; Reg2 is loaded with the contents of the block cipher; Reg2 is set to mode 'Shift As Reside' (SAR); the next state is IDLE.

Key State Machine 36: The descrambling process requires the use of a common key, there being a possible large number of such keys. An instruction byte IB (FIG. 4) passed in the data stream contains the key index information necessary to determine which of those keys is to be used. When the instruction byte appears in the data stream then the key state machine takes control of the input interface and performs the key look up operation.

The key state machine is held in signal 'key state' and the next state of the machine is held in state 'next key state'. The default state is IDLE. If the current state is IDLE and an instruction byte arrives (this is indicated by the PID-processor 34) then the next state progression is KEY 1 followed by KEY 2 followed by IDLE. During KEY 1 and KEY 2 the signal 'look up key' is asserted '1' causing a look up of the key addressed by two Register values. These are 'sc bits' and 'key index' which are constructed from the instruction byte. The key file returns the key value on the bus COMMON_KEY. This is registered inside the key file in descrambler 40 and control state machine 38.

Control State Machine 38

Figure 11:
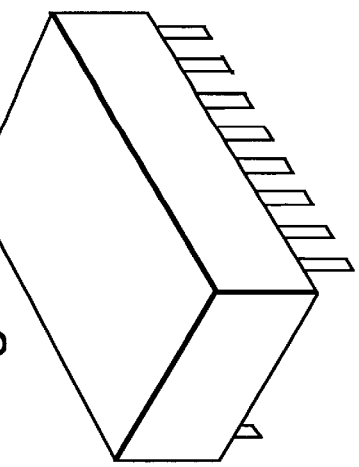
FIG. 11 is a schematic view of an integrated circuit chip incorporating the circuit of FIG. 3.

As regards the specific construction of the control state machine, it will be understood that it is practice within the art to define a machine construction in terms of a software routine written in a hardware programming language, VHDL, and for a computer directly to translate such routines into a set of layout diagrams and chip masks for a chip consisting of hard-wired logic gates, the chip being indicated schematically in FIG. 11. There is not normally generated anything which corresponds to a traditional functional block diagram.

Accordingly the construction of the control state machine is defined by the following routine:

Process: next_state_proc

This process calculates the next state of the control state machine. It also flags when to start the block cipher, when to load Reg2 and which mode to set for Reg2.

```
next_state_proc: process
(current_state, new_byte_flag, captured, bc_busy,
first_block_flag, r1_sc_full_flag, int_r1_shift,
r1_full_flag, reg2_active_mode, last_block_flag,
int_bc_key, common_key, pack_end_flag, if_empty)
begin
a_bc_key<=int_bc_key;
bc_start<=NO;
reg2_load_13 flag<=NO;
a_reg2_active_mode<=reg2_active_mode;
exit_state<=NO;
case (current_state) is
when IDLE=>
   if (new_byte_flag=YES and captured.sc=
     SCRAMBLED) then
     next_state<=GEN;
   elsif (new_byte_flag=YES and captured.sc=
     SCRAMBLED) then
next_state<=UNSCR;
elsif (pack_end_flag=YES) then
   next_state<=UNSCR;
else
   next_state<=IDLE;
   end if;
when GEN=>
if (if_empty=NO) then
   next_state<=current_state;
elsif (r1_full_flag=YES and last_block_flag=YES)
   then
     next_state<=LBCLOAD;
     exit_state<=YES;
  elsif (r1_sc_full_flag=YES) then
     if (first_block_flag=YES) then
        next_state<=FBCLOAD;
        a_bc_key<=common_key;
        exit_state<=YES;
     else
        next_state<=BCLOAD;
        exit_state<=YES;
     end if;
  else
     next_state<-IDLE;
     exit_state<-YES;
     end if;
when USCR=>
if (if_empty=NO) then
   next_state<=current_state;
elsif (r1_full_flag=YES and last_block_flag=YES)
   then
     next_state<=LBCLOAD;
     exit_state<=YES;
  elsif (r1_sc_full_flag=YES and first_block_flag=
     YES) then
     next_state<=FBCLOAD;
     a_bc_key<=common_key;
     exit_state<=YES;
  else
     next_state<=IDLE;
     exit_state<=YES;
end if;
when LBCLOAD=>
if (int_r1_shift=YES or bc_busy=YES) then
   next_state<=current_state;
else
   next_state<=IDLE;
   reg2_load_flag<=YES;
   a_reg2_active_mode<=SAR;
end if;
when FBCLOAD=>
if (int_r1_shift=YES or bc_busy=YES) then
   next_state<=current_state;
else
   next_state<=IDLE
   bc_start<=YES;
   a_reg2_active_mode<=EAR;
end if:
when BCLOAD=>
if (int_r1_shift=YES or bc_busy=YES) then
   next_state<=current_state;
else
   next_state<=IDLE;
   bc_start<=YES;
   reg2_load_flag<=YES;
   a_reg2_active_mode<=SAS;
end if;
when others=>
next_state<=IDLE;
end case;
end process next_state_proc;
```

It will be understood that control state machine 38 will be essentially the same construction, even if expressed differently using different nomenclature, changes in algorithm producing an equivalent result, and expressed in a different programming language, all of which changes will be apparent to the person skilled in the art. It is to be understood that the claims appended hereto are intended to cover all such variations.

What is claimed is:

1. An apparatus for processing digital video broadcast data in the form of a data stream containing interleaved data sections of scrambled data and of unscrambled data, said apparatus comprising:

a common data flow path provided for said data sections;

at least one data flow path loop emanating from and looping back to said common data flow path, each of said loops containing a cipher capable of descrambling said scrambled data;

a control capable of assuming a plurality of control states in order to selectively control the passage of said data sections through said common data flow path in order to descramble said scrambled data in said data flow path loops while maintaining the relative positions of said scrambled data and said unscrambled data in said data stream; and a packet identification processor capable of (i) identifying receipt of a packet of video data and indicating to said control the presence of scrambled and unscrambled data.

2. An apparatus as in claim 1, further comprising:

a first signal path loop having a stream cipher;

a second signal path loop having an input, an output, a block cipher, a first shift register in said common data flow path at said input to said second signal path loop, and a second shift register in said common data flow path at said output from said second signal path loop.

3. An apparatus as in claim 1, further comprising:

a key state capable of generating key signals for use by said cipher in response to instruction bytes in an incoming packet of data.

4. An apparatus for processing digital video broadcast data having interleaved sections of scrambled data and unscrambled data, said apparatus comprising:

a gate having a first input, a second input, and an output;

a data input terminal coupled to said first input of said gate;

a stream cipher having an input connected to said data input terminal, said stream cipher further having an output connected to said second input of said gate;

a first shift register having (i) an input coupled to said output of said gate (ii) a first output and (iii) a second output;

a second shift register having a first input, a second input, and an output, said first input of said second shift register is coupled to said first output of said first shift register;

a block cipher coupled between said second output of said first shift register and said second input of said second shift register;

a control responsive to whether data at said data input terminal is said scrambled data or said unscrambled data, said control capable of enabling said stream cipher, said block cipher, said first shift register and said second shift register to pass an unscrambled data through said first shift register and said second shift register, said control further capable of enabling said scrambled data to pass through said stream cipher and said block cipher, wherein said control can occupy (i) an IDLE state, (ii) a GEN state designating a processing state for scrambled data, (iii) an UNSCR state designating a processing state for unscrambled data, (iv) a BCLOAD state designating a processing state for loading and unloading said block cipher, (v) an FBLOAD state designating a processing state for loading said block cipher with a first block of scrambled field, and (vi) an LBCLOAD state designating a processing state for handling any scrambled residue.

5. An apparatus as in claim 4, further including a first block counter and a second block counter each capable of counting a field in said scrambled data.

6. An apparatus as in claim 5, wherein:

said first block counter counts from a beginning of a first field of said scrambled data; and said second block counter counts from a beginning of a second field of said scrambled data.

7. An apparatus as in claim 4, wherein said apparatus further includes a packet counter capable of counting the number of bytes since the start of a packet of said video data.

8. An apparatus as in claim 2, wherein said control can occupy (i) an IDLE state, (ii) a GEN state designating a processing state for scrambled data, (iii) an UNSCR state designating a processing state for unscrambled data, (iv) a BCLOAD state designating a processing state for loading and unloading said block cipher, (v) an FBLOAD state designating a processing state for loading said block cipher with a first block of scrambled field, and (vi) an LBCLOAD state designating a processing state for handling any scrambled residue.

9. An apparatus as in claim 1, wherein said control is constructed and arranged to perform the steps of:

providing a next_state variable, a current_state variable, a new_byte_flag variable, a captured variable, a bc_busy variable, a first_block_flag variable, an r1_sc_full_flag variable, an int_r1_shift variable, an r1_full_flag variable, a reg2_active_mode variable, a last_block_flag variable, an int_bc_key variable, a common_key variable, a pack_end_flag variable, an if_empty variable, an a_bc_key variable, a bc_start variable, a reg2_load_flag variable, an a_reg2_active_mode variable, and an exit_state variable;

setting said a_bc_key variable equal to said int_bc_key variable;

setting said bc_start variable to NO;

setting said reg2_load_flag variable to NO;

setting said a_reg2_active_mode variable equal to said reg2_active_mode variable;

setting said exit_state variable equal to NO; and if said current_state is set to IDLE then if said new_byte_flag variable is set to YES and said captured variable is set to SCRAMBLED then setting said next_state variable equal to GEN;

otherwise if said new_byte_flag variable is set to YES and said captured variable is set to UNSCRAMBLED then setting said next_state variable equal to UNSCR;

otherwise if said pack_end_flag is set to YES then setting said next_state variable to UNSCR;

otherwise setting said next_state variable to IDLE;

otherwise if said current_state is set to GEN then if said if_empty variable is set to NO then setting said next_state variable equal to said current_state variable, otherwise if said r1_sc_full_flag is set to YES and said last_block_flag variable is set to YES then setting said next_state variable equal to LBCLOAD; and
setting said exit_state variable equal to YES;
otherwise if said r1_sc_full_flag is set to YES then
    if said first_block_flag is set to YES then
        setting said next_state variable equal to FBCLOAD;
        setting said a_bc_key variable equal to said common_key variable; and
        setting said exit_state variable equal to YES,
    otherwise
        setting said next_state variable equal to BCLOAD; and
        setting said exit_state variable equal to YES;
otherwise
    setting said next_state variable equal to IDLE; and
    setting said exit_state variable equal to YES;
otherwise if said current_state is set to USCR then
    if said if_empty variable is set to NO then
        setting said next_state variable equal to said current_state variable;
    otherwise if said r1_full_flag variable is equal to YES and said last_block_flag is set equal to YES then
        setting said next_state variable equal to LBCLOAD; and
        setting said exit_state equal to YES;
    otherwise if said r1_sc_full_flag variable is set to YES and said first_block_flag variable is set to YES then
        setting said next_state variable equal to FBCLOAD;
        setting said a_bc_key variable equal to said common_key variable; and
        setting said exit_state variable equal to YES;
    otherwise
        setting said next_state variable equal to IDLE; and
        setting said exit_state variable equal to YES;
otherwise if said current_state is set to LBCLOAD then
    if said int_r1_shift variable is set to YES or said bc_busy variable is set to YES then
        setting said next_state variable equal to said current_state variable;
    otherwise
        setting said next_state variable equal to IDLE;
        setting said reg2_load_flag variable equal to YES; and
        setting said a_reg2_active_mode varable equal to SAR;
otherwise if said current_state is set to FBCLOAD then
    if said int_r1_shift variable is set to YES or said bc_busy variable is set to YES then
        setting said next_state variable equal to said current state variable;
    otherwise
        setting said next_state variable equal to IDLE;
        setting said bc_start variable equal to YES; and
        setting said a_reg2_active_mode variable equal to EAR;
otherwise if said current_state is set to BCLOAD then
    if said int_r1_shift variable is set to YES or said bc_busy variable is set to YES then
        setting said next_state variable equal to said current_state variable;
    otherwise
        setting said next_state variable equal to IDLE;
        setting said bc_start variable equal to YES; and
        setting said reg2_load_flag variable equal to YES;
        setting said a_reg2_active_mode variable equal to SAS;
otherwise setting said next_state variable equal to IDLE.

10. An apparatus as in claim 1, wherein said apparatus is incorporated onto an integrated circuit chip.

11. A method of processing a stream of digital video broadcast data having interleaved sections of scrambled data and unscrambled data, said method comprising the steps of:

providing a common data flow path both for sections of said unscrambled data and for sections of said scrambled data;

providing at least one data flow path loop, said loops extending from and returning to said common flow path, said loops containing a cipher capable of descrambling said scrambled data;

controlling the passage of said digital video broadcast data through said common data flow path and said loops to pass said unscrambled data sections through said common data flow path and to pass said scrambled data through said data flow path loops while maintaining the relative positions of said scrambled data sections and said unscrambled data sections in said data stream; and generating key signals used by said cipher when descrambling data.

12. A method as in claim 11, further comprising the steps of:

providing a first signal path loop containing a stream cipher;

providing a second signal path loop containing an input, and output, and a block cipher;

providing a first shift register in said common data flow path at said input to said second signal path loop; and providing a second shift register in said common data flow path at said output to said second signal path loop.

13. A method as in claim 11, further comprising the steps of:

identifying receipt of a packet of said digital video broadcast data; and identifying the presence of scrambled data and unscrambled data to enable said step of controlling the passage of said of said data within said data flow paths.

14. A method as in claim 12, wherein said step of controlling is divided into:

an IDLE state;

a GEN state designating a processing state for scrambled data;

an UNSCR state designating a processing state for unscrambled data;

a BCLOAD state designating a processing state for loading and unloading said block cipher;

an FBLOAD state designating a processing state for loading said block cipher with a first block of a scrambled field, and an LBCLOAD state designating a processing state for handling any scrambled residue.

15. A method as in claim 14, wherein said step of controlling comprises the steps of:

providing a next_state variable, a current_state variable, a new_byte_flag variable, a captured variable, a bc_busy variable, a first_block_flag variable, an r1_sc_full_flag variable, an int_r1_shift variable, an r1_full_flag variable, a reg2_active_mode variable, a last_block_flag variable, an int_bc_key variable, a common_key variable, a pack_end_flag variable, an if_empty variable, an a_bc_key variable, a bc_start variable, a reg2_load_flag variable, an a_reg2_active_mode variable, and an exit_state variable;

setting said a_bc_key variable equal to said int_bc_key variable;

setting said bc_start variable to NO;

setting said reg2_load_flag variable to NO;

setting said a_reg2_active_mode variable equal to said reg2_active_mode variable;

setting said exit_state variable equal to NO; and if said current_state is set to IDLE then
  if said new_byte_flag variable is set to YES and said captured variable is set to SCRAMBLED then
    setting said next_state variable equal to GEN;
  otherwise if said new_byte_flag variable is set to YES and said captured variable is set to UNSCRAMBLED then
    setting said next_state variable equal to UNSCR;
  otherwise if said pack_end_flag is set to YES then
    setting said next_state variable to UNSCR;
  otherwise
    setting said next_state variable to IDLE;
otherwise if said current_state is set to GEN then
  if said if_empty variable is set to NO then
    setting said next_state variable equal to said current_state variable,
  otherwise if said r1_sc_full_flag is set to YES and said last_block_flag variable is set to YES then
    setting said next_state variable equal to LBCLOAD; and
    setting said exit_state variable equal to YES;
  otherwise if said r1_sc_full_flag is set to YES then
    if said first_block_flag is set to YES then
      setting said next_state variable equal to FBCLOAD;
      setting said a_bc_key variable equal to said common_key variable; and
      setting said exit_state variable equal to YES,
    otherwise
      setting said next_state variable equal to BCLOAD; and
      setting said exit_state variable equal to YES;
  otherwise
    setting said next_state variable equal to IDLE; and
    setting said exit_state variable equal to YES;
otherwise if said current_state is set to USCR then
  if said if_empty variable is set to NO then
    setting said next_state variable equal to said current_state variable;
  otherwise if said r1_full_flag variable is equal to YES and said last_block_flag is set equal to YES then
    setting said next_state variable equal to LBCLOAD; and
    setting said exit_state equal to YES;
  otherwise if said r1_sc_full_flag variable is set to YES and said first_block_flag variable is set to YES then
    setting said next_state variable equal to FBCLOAD;
    setting said a_bc_key variable equal to said common_key variable; and
    setting said exit_state variable equal to YES;
  otherwise
    setting said next_state variable equal to IDLE; and
    setting said exit_state variable equal to YES;
otherwise if said current_state is set to LBCLOAD then
  if said int_r1_shift variable is set to YES or said bc_busy variable is set to YES then
    setting said next_state variable equal to said current_state variable;
  otherwise
    setting said next_state variable equal to IDLE;
    setting said reg2_load_flag variable equal to YES; and
    setting said a_reg2_active_mode variable equal to SAR;
otherwise if said current_state is set to FBCLOAD then
  if said int_r1_shift variable is set to YES or said bc_busy variable is set to YES then
    setting said next_state variable equal to said current_state variable;
  otherwise
    setting said next_state variable equal to IDLE;
    setting said bc_start variable equal to YES; and
    setting said a_reg2_active_mode variable equal to EAR;
otherwise if said current_state is set to BCLOAD then
  if said int_r1_shift variable is set to YES or said bc_busy variable is set to YES then
    setting said next_state variable equal to said current_state variable;
  otherwise
    setting said next_state variable equal to IDLE;
    setting said bc_start variable equal to YES; and
    setting said reg2_load_flag variable equal to YES;
    setting said a_reg2_active_mode variable equal to SAS;
otherwise setting said next_state variable equal to IDLE.

* * * * *